(12) United States Patent
Chaudhry et al.

(10) Patent No.: US 6,704,862 B1
(45) Date of Patent: Mar. 9, 2004

(54) METHOD AND APPARATUS FOR FACILITATING EXCEPTION HANDLING USING A CONDITIONAL TRAP INSTRUCTION

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 613 days.

(21) Appl. No.: 09/591,142

(22) Filed: Jun. 9, 2000

Related U.S. Application Data
(60) Provisional application No. 60/186,979, filed on Mar. 6, 2000.

(51) Int. Cl.[7] .................................................. G06F 9/38
(52) U.S. Cl. .......................................... 712/244; 712/24
(58) Field of Search ................................... 712/244, 24

(56) References Cited

U.S. PATENT DOCUMENTS

| | | |
|---|---|---|
| 5,367,696 A | 11/1994 | Abe |
| 5,634,023 A | 5/1997 | Adler et al. |
| 5,778,219 A | 7/1998 | Amerson et al. |
| 5,802,337 A | 9/1998 | Fielden |
| 5,815,719 A | 9/1998 | Goebel |
| 5,835,776 A | 11/1998 | Tirumalai et al. |
| 6,301,705 B1 | 10/2001 | Doshi et al. |
| 6,487,716 B1 | 11/2002 | Choi et al. |

FOREIGN PATENT DOCUMENTS

| | | |
|---|---|---|
| WO | WO 99/19795 | 4/1999 |

*Primary Examiner*—William M. Treat
(74) *Attorney, Agent, or Firm*—Park, Vaughan & Fleming LLP

(57) ABSTRACT

One embodiment of the present invention provides a system that supports exception handling through use of a conditional trap instruction. The system supports a head thread that executes program instructions and a speculative thread that speculatively executes program instructions in advance of the head thread. During operation, the system uses the speculative thread to execute code, which includes an instruction that can cause an exception condition. After the instruction is executed, the system determines if the instruction caused the exception condition. If so, the system writes an exception condition indicator to a register. At some time in the future, the system executes a conditional trap instruction which examines a value in the register. If the value in the register is an exception condition indicator, the system executes a trap handling routine to handle the exception condition. Otherwise, the system proceeds with execution of the code. In one embodiment of the present invention, prior to executing the instruction, the system allows a compiler to optimize a program containing the instruction. This optimization process includes scheduling an exception testing instruction associated with the instruction to occupy a free instruction slot following the instruction. This exception testing instruction determines if the instruction causes the exception condition. In one embodiment of the present invention, the trap handling routine triggers a rollback operation to undo operations performed by the speculative thread.

24 Claims, 7 Drawing Sheets

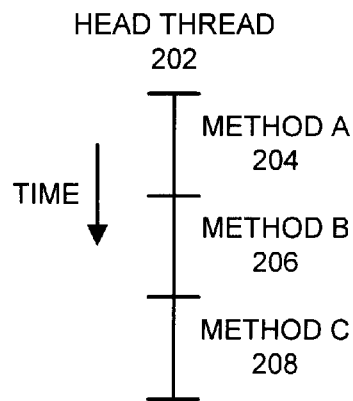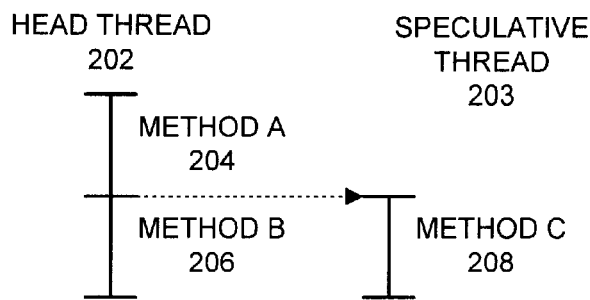
FIG. 2A (PRIOR ART)
FIG. 2B
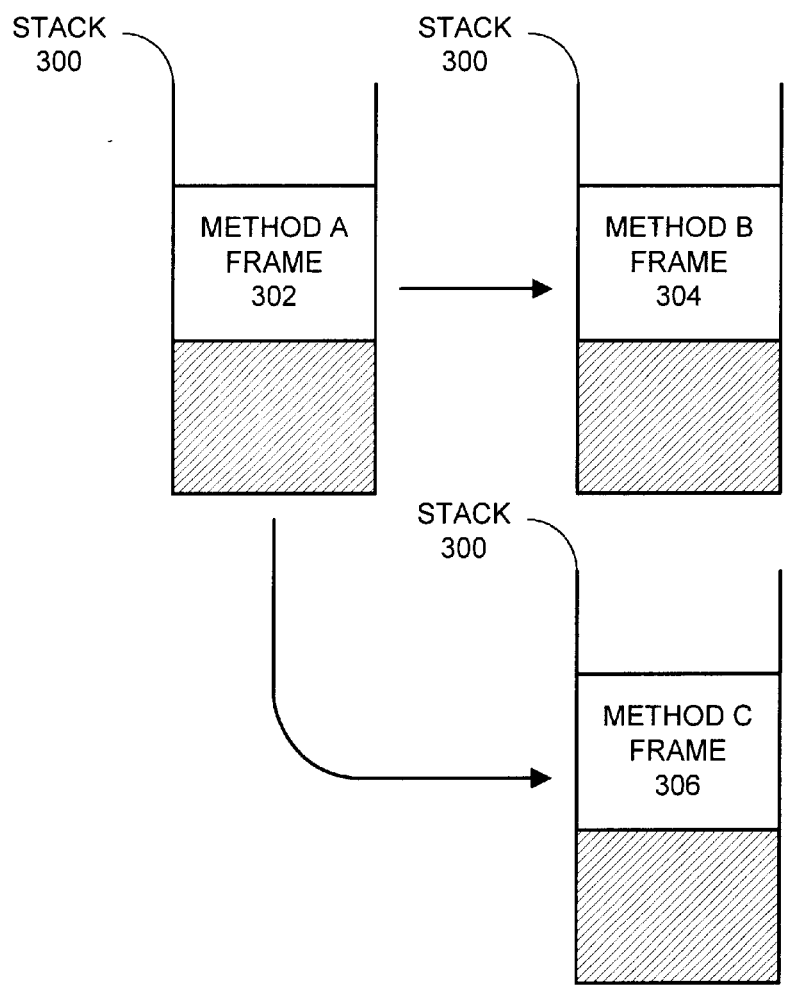
FIG. 3

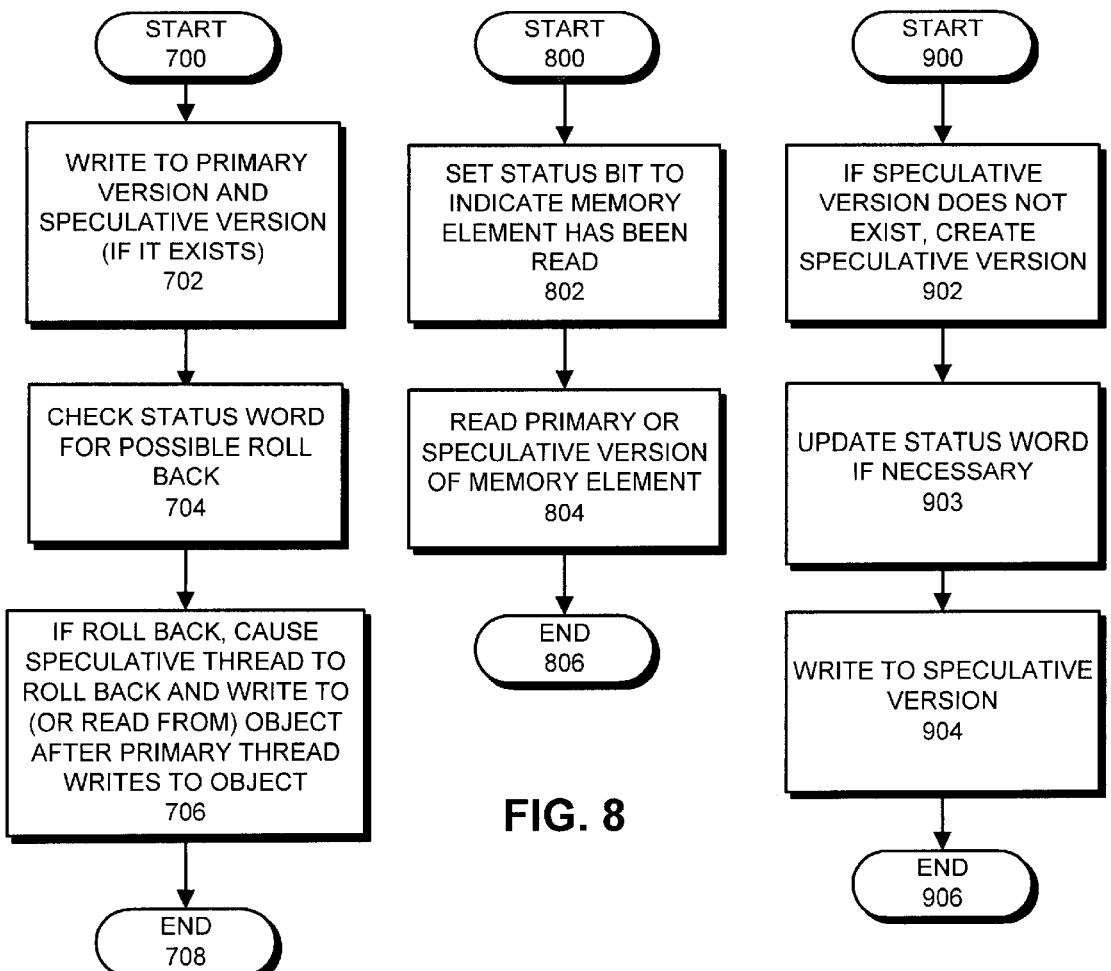

METHOD AND APPARATUS FOR FACILITATING EXCEPTION HANDLING USING A CONDITIONAL TRAP INSTRUCTION

RELATED APPLICATION

This application hereby claims priority under 35 U.S.C. § 119 to U. S. Provisional Patent Application No. 60/186,979 filed on Mar. 6, 2000.

BACKGROUND

1. Field of the Invention

The present invention relates to techniques for improving computer system performance. More specifically, the present invention relates to a method and an apparatus for supporting exception handling through use of a conditional trap instruction.

2. Related Art

As increasing semiconductor integration densities allow more transistors to be integrated onto a microprocessor chip, computer designers are investigating different methods of using these transistors to increase computer system performance. Some recent computer architectures exploit "instruction level parallelism," in which a single central processing unit (CPU) issues multiple instructions in a single cycle. Given proper compiler support, instruction level parallelism has proven effective at increasing computational performance across a wide range of computational tasks. However, inter-instruction dependencies generally limit the performance gains realized from using instruction level parallelism to a factor of two or three.

Another method for increasing computational speed is "speculative execution" in which a processor executes multiple branch paths simultaneously, or predicts a branch, so that the processor can continue executing without waiting for the result of the branch operation. By reducing dependencies on branch conditions, speculative execution can increase the total number of instructions issued.

Unfortunately, conventional speculative execution typically provides a limited performance improvement because only a small number of instructions can be speculatively executed. One reason for this limitation is that conventional speculative execution is typically performed at the basic block level, and basic blocks tend to include only a small number of instructions. Another reason is that conventional hardware structures used to perform speculative execution can only accommodate a small number of speculative instructions.

What is needed is a method and apparatus that facilitates speculative execution of program instructions at a higher level of granularity so that many more instructions can be speculatively executed.

One challenge in designing a system that supports speculative execution is to provide an efficient mechanism to support exception handling for a speculative thread. Exception handling can cause code to execute slowly because testing for exceptions typically involves using control flow statements (such as if statements). These control flow statements can severely restrict a compiler's ability to move code around during the code optimization process in order to achieve an efficient scheduling of program instructions. Achieving an efficient scheduling of program instructions is particularly important for computer systems with multiple functional units.

Hence, what is needed is a method and an apparatus for providing exception handling without unnecessarily limiting a compiler's ability to move code around during the code optimization process.

SUMMARY

One embodiment of the present invention provides a system that supports exception handling through use of a conditional trap instruction. The system supports a head thread that executes program instructions and a speculative thread that speculatively executes program instructions in advance of the head thread. During operation, the system uses the speculative thread to execute code, which includes an instruction that can cause an exception condition. After the instruction is executed, the system determines if the instruction caused the exception condition. If so, the system writes an exception condition indicator to a register. At some time in the future, the system executes a conditional trap instruction which examines a value in the register. If the value in the register is an exception condition indicator, the system executes a trap handling routine to handle the exception condition. Otherwise, the system proceeds with execution of the code.

In one embodiment of the present invention, prior to executing the instruction, the system allows a compiler to optimize a program containing the instruction. This optimization process includes scheduling an exception testing instruction associated with the instruction to occupy a free instruction slot following the instruction. This exception testing instruction determines if the instruction causes the exception condition. In a variation on this embodiment, the system additionally performs register allocation as part of the optimization process. In a variation on this embodiment, the compiler operates as part of a just-in-time compilation mechanism.

In one embodiment of the present invention, the trap handling routine triggers a rollback operation to undo operations performed by the speculative thread.

In one embodiment of the present invention, prior to executing the instruction, the system inserts the conditional trap instruction in the vicinity of a return from a code module containing the instruction. In this way, the conditional trap instruction is executed at the end of the code module, which allows the condition trap instruction to detect whether instructions within the code module caused an exception condition.

In one embodiment of the present invention, the instruction can include a number of different instructions, including a getfield instruction, that generates an exception condition if a reference to an object containing the field is a null pointer. The instruction can also include a putfield instruction, that generates an exception condition if a reference to the object containing the field is a null pointer. The instruction can alternatively include a check cast instruction that assigns a value to a first variable if the value originates from a second variable with a type that matches the type of the first variable, and if not generates an exception condition. The instruction may additionally include an array store instruction that assigns a value to an array element if the type of the array element matches the type of a variable from which the value originates, and if not generates an exception condition.

In one embodiment of the present invention, the conditional trap instruction is located within a very long instruction word (VLIW) instruction.

BRIEF DESCRIPTION OF THE FIGURES

FIG. 2A illustrates sequential execution of methods by a single thread.

FIG. 2B illustrates space and time dimensional execution of a method in accordance with an embodiment of the present invention.

FIG. 3 illustrates the state of the system stack during space and time dimensional execution of a method in accordance with an embodiment of the present invention.

FIG. 7 is a flow chart illustrating operations involved in performing a write to a memory element by a head thread in accordance with an embodiment of the present invention.

FIG. 8 is a flow chart illustrating operations involved in performing a read to a memory element by a speculative thread in accordance with an embodiment of the present invention.

FIG. 9 is a flow chart illustrating operations involved in performing a write to a memory element by a speculative thread in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may carry information across a communications network, such as the Internet.

Computer System

Figure 1:
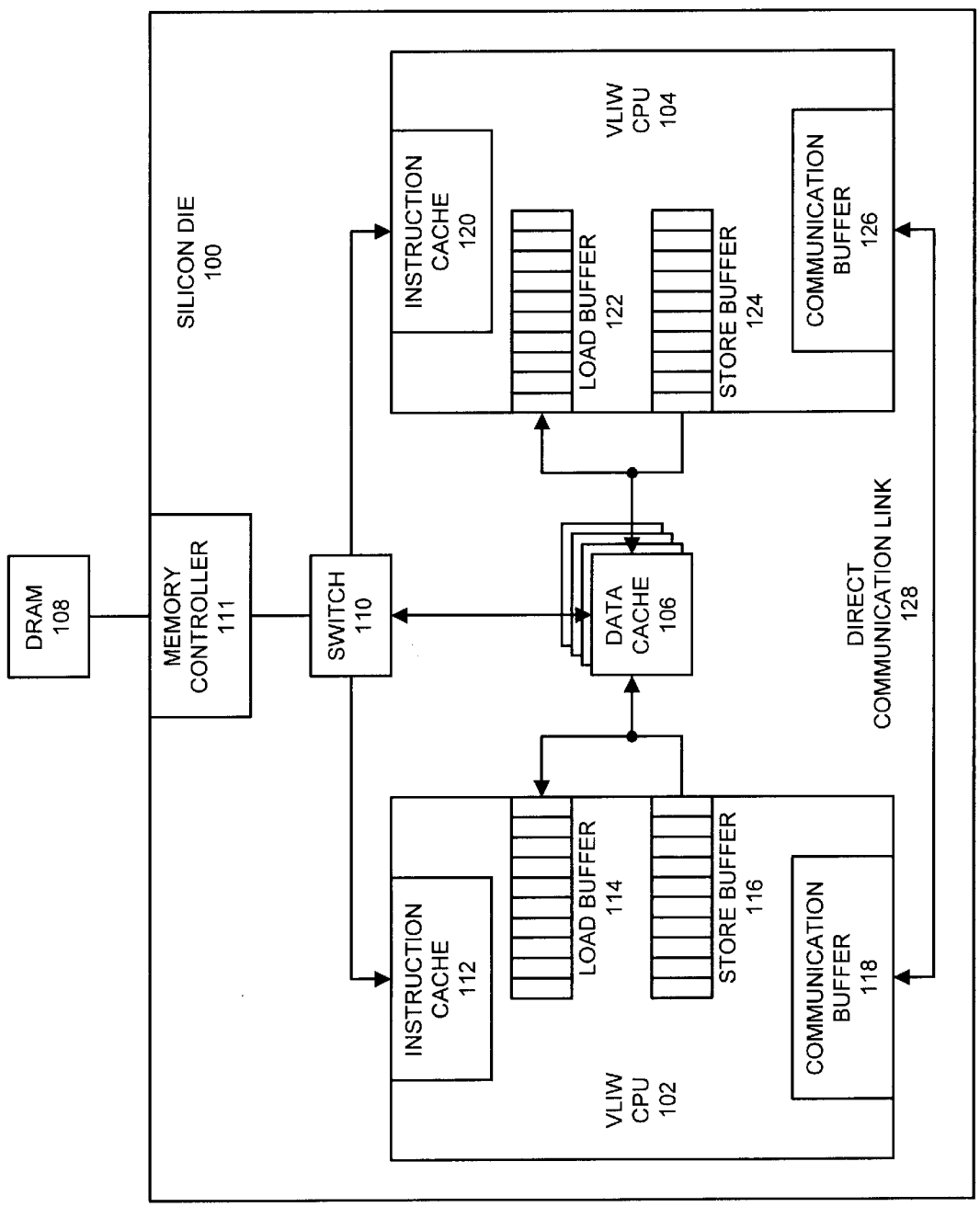
FIG. 1 illustrates a computer system including two central processing units sharing a common data cache in accordance with an embodiment of the present invention.

FIG. 1 illustrates a computer system including two central processing units (CPUs) 102 and 104 sharing a common data cache 106 in accordance with an embodiment of the present invention. In this embodiment, CPUs 102 and 104 and data cache 106 reside on silicon die 100. Note that CPUs 102 and 104 may generally be any type of computational devices that allow multiple threads to execute concurrently. In the embodiment illustrated in FIG. 1, CPUs 102 and 104 are very long instruction word (VLIW) CPUs, which support concurrent execution of multiple instructions executing on multiple functional units. VLIW CPUs 102 and 104 include instruction caches 112 and 120, respectively, containing instructions to be executed by VLIW CPUs 102 and 104.

VLIW CPUs 102 and 104 additionally include load buffers 114 and 122 as well as store buffers 116 and 124 for buffering communications with data cache 106. More specifically, VLIW CPU 102 includes load buffer 114 for buffering loads received from data cache 106, and store buffer 116 for buffering stores to data cache 106. Similarly, VLIW CPU 104 includes load buffer 122 for buffering loads received from data cache 106, and store buffer 124 for buffering stores to data cache 106.

VLIW CPUs 102 and 104 are additionally coupled together by direct communication link 128, which facilitates rapid communication between VLIW CPUs 102 and 104. Note that direct communication link 128 allows VLIW CPU 102 to write into communication buffer 126 within VLIW CPU 104. It also allows VLIW CPU 104 to write into communication buffer 118 within VLIW CPU 102.

In the embodiment illustrated in FIG. 1, Data cache 106 is fully dual-ported allowing concurrent read and/or write accesses from VLIW CPUs 102 and 104. This dual porting eliminates cache coherence delays associated with conventional shared memory architectures that rely on coherent caches.

In one embodiment of the present invention, data cache 106 is a 16K byte 4-way set-associative data cache with 32 byte cache lines.

Data cache 106, instruction caches 112 and instruction cache 120 are coupled through switch 110 to memory controller 111. Memory controller 111 is coupled to dynamic random access memory (DRAM) 108, which is located off chip. Switch 110 may include any type of circuitry for switching signal lines In one embodiment of the present invention, switch 110 is a cross bar switch.

The present invention generally applies to any computer system that supports concurrent execution by multiple threads and is not limited to the illustrated computing system. However, note that data cache 106 supports fast accesses to shared data items. These fast accesses facilitate efficient sharing of status information between VLIW CPUs 102 and 104 to keep track of accesses to versions of memory objects.

Space-Time Dimensional Execution of Methods

FIG. 2A illustrates sequential execution of methods in a conventional computer system by a single head thread 202. In executing a program, head thread 202 executes a number of methods in sequence, including method A 204, method B 206 and method C 208.

In contrast, FIG. 2B illustrates space and time dimensional execution of a method in accordance with an embodiment of the present invention. In FIG. 2B, head thread 202 first executes method A 204 and then executes method B 206. (For this example, assume that method B 206 returns a void or some other value that is not used by method C 208. Alternatively, if method C 208 uses a value returned by method B206, assume that method C 208 uses a predicted return value from method B 206.)

As head thread 202 executes method B 206, speculative thread 203 executes method C 208 in a separate space-time dimension of the heap. If head thread 202 successfully executes method B 206, speculative thread 203 is joined with head thread 202. This join operation involves causing state associated with the speculative thread 203 to be merged with state associated with the head thread 202 and the collapsing of the space-time dimensions of the heap.

If speculative thread 203 for some reason encounters problems in executing method C 208, speculative thread 203 performs a rollback operation. This rollback operation allows speculative thread 203 to reattempt to execute method C 208. Alternatively, head thread 202 can execute method C 208 non-speculatively and speculative thread 203 can execute a subsequent method.

There are a number of reasons why speculative thread 203 may encounter problems in executing method C 208. One problem occurs when head thread 202 executing method B 206 writes a value to a memory element (object) after speculative thread 203 has read the same memory element. The same memory element can be read when the two space-time dimensions of the heap are collapsed at this memory element at the time of the read by speculative thread 203. In this case, speculative thread 203 should have read the value written by head thread 202, but instead has read a previous value. In this case, the system causes speculative thread 203 to roll back so that speculative thread 203 can read the value written by head thread 202.

Note that the term "memory element" generally refers to any unit of memory that can be accessed by a computer program. For example, the term "memory element" may refer to a bit, a byte or a word memory, as well as a data structure or an object defined within an object-oriented programming system.

FIG. 3 illustrates the state of the system stack during space and time dimensional execution of a method in accordance with an embodiment of the present invention. Note that since programming languages such as the Java programming language do not allow a method to modify the stack frame of another method, the system stack will generally be the same before method B 206 is executed as it is before method C 208 is executed. (This is not quite true if method B 206 returns a parameter through the system stack. However, return parameters are can be explicitly dealt with as is described below.) Referring the FIG. 3, stack 300 contains method A frame 302 while method A 204 is executing. When method A 204 returns, method B 206 commences and method A frame 302 is replaced by method B frame 304. Finally, when method B 206 returns, method C 208 commences and method B frame 304 is replaced by method C frame 306. Note that since stack 300 is the same immediately before method B 206 executed as it is immediately before method C 208 is executed, it is possible to execute method C 208 using a copy of stack 300 without first executing method B 206.

In order to undo the results of speculatively executed operations, updates to memory need to be versioned. The overhead involved in versioning all updates to memory can be prohibitively expensive due to increased memory requirements, decreased cache performance and additional hardware required to perform the versioning.

Fortunately, not all updates to memory need to be versioned. For example, updates to local variables—such as a loop counter—on a system stack are typically only relevant to the thread that is updating the local variables. Hence, even for speculative threads versioning updates to these local variables is not necessary.

When executing programs written in conventional programming languages, such as C, it is typically not possible to determine which updates are related to the heap, and which updates are related to the system stack. These programs are typically compiled from a high-level language representation into executable code for a specific machine architecture. This compilation process typically removes distinctions between updates to heap and system stack.

The same is not true for new platform-independent computer languages, such as the JAVA™ programming language distributed by SUN Microsystems, Inc. of Palo Alto, Calif. (Sun, the Sun logo, Sun Microsystems, and Java are trademarks or registered trademarks of Sun Microsystems, Inc. in the United States and other countries.) A program written in the Java programming language is typically compiled into a class file containing Java byte codes. This class file can be transmitted over a computer network to a distant computer system to be executed on the distant computer system. Java byte codes are said to be "platform-independent," because they can be executed across a wide range of computing platforms, so long as the computing platforms provide a Java virtual machine.

A Java byte code can be executed on a specific computing platform by using an interpreter or a just in time (JIT) compiler to translate the Java byte code into machine code for the specific computing platform. Alternatively, a Java byte code can be executed directly on a Java byte code engine running on the specific computing platform.

Fortunately, a Java byte code contains more syntactic information than conventional machine code. In particular, the Java byte codes differentiate between accesses to local variables in the system stack and accesses to the system heap. Furthermore, programs written in the Java programming language do not allow conversion between primitive and reference types. Such conversion can make it hard to differentiate accesses to the system stack from accesses to the system heap at compile time.

Data Structures to Support Space-Time Dimensional Execution

Figure 4:
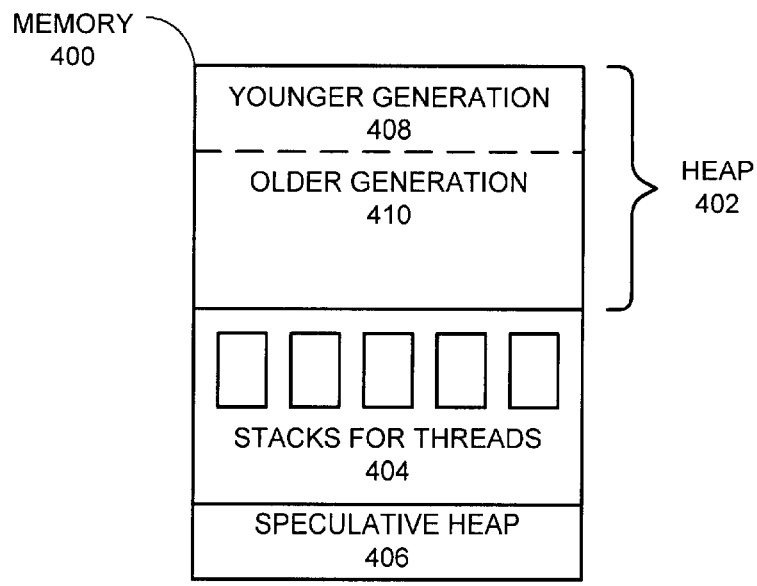
FIG. 4 illustrates how memory is partitioned between stack and heap in accordance with an embodiment of the present invention.
Figure 5:
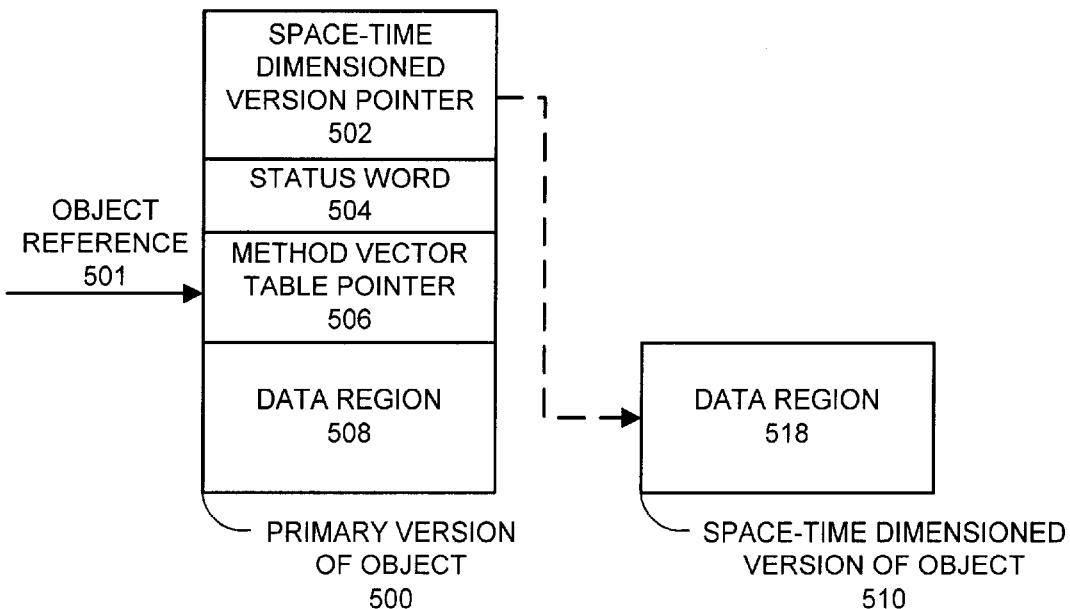
FIG. 5 illustrates the structure of a primary version and a space-time dimensioned version of an object in accordance with an embodiment of the present invention.

FIG. 4 illustrates how memory is partitioned between stack and heap in accordance with an embodiment of the present invention. In FIG. 4, memory 400 is divided into a number of regions including heap 402, stacks for threads 404 and speculative heap 406. Heap 402 comprises a region of memory from which objects are allocated. Heap 402 is further divided into younger generation region 408 and older generation region 410 for garbage collection purposes. For performance reasons, garbage collectors typically treat younger generation objects differently from older generation objects. Stack for threads 404 comprises a region of memory from which stacks for various threads are allocated. Speculative heap 406 contains the space-time dimensioned values of all memory elements where the two space-time dimensions of the heap are not collapsed. This includes space-time dimensional versions of objects, for example, version 510 of object 500 as shown in FIG. 5, and objects created by speculative thread 203. For garbage collection purposes, these objects created by speculative thread 203 can be treated as belonging to a generation that is younger than objects within younger generation region 408.

FIG. 5 illustrates the structure of a primary version of object 500 and a space-time dimensioned version of object 510 in accordance with an embodiment of the present invention.

Primary version of object 500 is referenced by object reference pointer 501. Like any object defined within an object-oriented programming system, primary version of object 500 includes data region 508, which includes one or more fields containing data associated with primary version of object 500. Primary version of object 500 also includes method vector table pointer 506. Method vector table pointer 506 points to a table containing vectors that point to the methods that can be invoked on primary version of object 500.

Primary version of object 500 also includes space-time dimensioned version pointer 502, which points to space-time dimensioned version of object 510, if the two space-time dimensions are not collapsed at this object. Note that in the illustrated embodiment of the present invention, space-time dimensioned version 510 is always referenced indirectly through space-time dimensioned version pointer 502. Primary version of object 500 additionally includes status word 504, which contains status information specifying which fields from data region 508 have been written to or read by speculative thread 203. Space-time dimensioned version of object 510 includes only data region 518.

Figure 6:
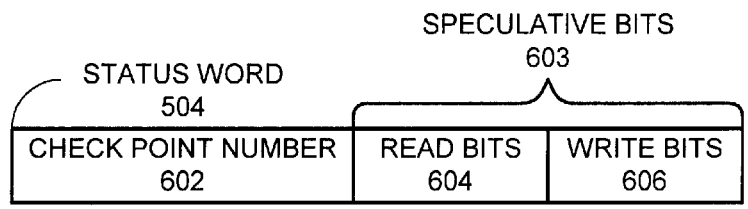
FIG. 6 illustrates the structure of a status word for an object in accordance with an embodiment of the present invention.

FIG. 6 illustrates the structure of status word 504 in accordance with an embodiment of the present invention. In this embodiment, status word 504 includes checkpoint number 602 and speculative bits 603. Speculative bits 603 includes read bits 604 and write bits 606. When status word 504 needs to be updated due to a read or a write by speculative thread 203, checkpoint number 602 is updated with the current time of the system. The current time in the time dimension of the system is advanced discretely at a join or a rollback. This allows checkpoint number 602 to be used as a qualifier for speculative bits 603. If checkpoint number 602 is less than the current time, speculative bits 603 can be interpreted as reset.

Read bits 604 keep track of which fields within data region 508 have been read since the last join or rollback. Correspondingly, write bits 606 keep track of which fields within data region 508 have been written since the last join or rollback. In one embodiment of the present invention, read bits 604 includes one bit for each field within data region 508. In another embodiment, read bits includes fewer bits than the number of fields within data region 508. In this embodiment, each bit within read bits 604 corresponds to more than one field in data region 508. For example, if there are eight read bits, each bit corresponds to every eighth field. Write bits 606 similarly can correspond to one or multiple fields within data region 508.

Space-Time Dimensional Update Process

Space-time dimensioning occurs during selected memory updates. For local variable and operand accesses to the system stack, no space-time dimensioned versions exist and nothing-special happens. During read operations by head thread 202 to objects in the heap 402, again nothing special happens.

Special operations are involved in write operations by head thread 202 as well as read and write operations by speculative thread 203. These special operations are described in more detail with reference to FIGS. 7, 8 and 9 below.

FIG. 7 is a flow chart illustrating operations involved in a write operation to an object by a head thread 202 in accordance with an embodiment of the present invention. The system writes to the primary version of object 500 and the space-time dimensioned version of object 510 if the two space-time dimensions are not collapsed at this point (step 702). Next, the system checks status word 504 within primary version of object 500 to determine whether a rollback is required (step 704). A rollback is required if speculative thread 203 previously read the data element. The same memory element can be read when the two space-time dimensions of the heap are collapsed at this memory element at the time of the read by speculative thread 203. A rollback is also required if speculative thread 203 previously wrote to the object and thus ensured that the two dimensions of the object are not collapsed at this element, and if the current write operation updates both primary version of object 500 and space-time dimensioned version of object 510.

If a rollback is required, the system causes speculative thread 203 to perform a rollback operation (step 706). This rollback operation allows speculative thread 203 to read from (or write to) the object after head thread 202 writes to the object.

Note that in the embodiment of the present invention illustrated in FIG. 7 the system performs writes to both primary version 500 and space-time dimensioned version 510. In an alternative embodiment, the system first checks to determine if speculative thread 203 previously wrote to space-time dimensioned version 510. If not, the system writes to both primary version 500 and space-time dimensioned version 510. If so, the system only writes to primary version 500.

FIG. 8 is a flow chart illustrating operations involved in a read operation to an object by speculative thread 203 in accordance with an embodiment of the present invention. During this read operation, the system sets a status bit in status word 504 within primary version of object 500 to indicate that primary version 500 has been read (step 802). Speculative thread 203 then reads space-time dimensioned version 510, if it exists. Otherwise, speculative thread 203 reads primary version 500.

FIG. 9 is a flow chart illustrating operations involved in a write operation to a memory element by speculative thread 203 in accordance with an embodiment of the present invention. If a space-time dimensioned version 510 does not exist, the system creates a space-time dimensioned version 510 in speculative heap 406 (step 902). The system also updates status word 504 to indicate that speculative thread 203 has written to the object if such updating is necessary (step 903). The system next writes to space-time dimensioned version 510 (step 904). Such updating is necessary if head thread 202 must subsequently choose between writing to both primary version 500 and space-time dimensioned version 510, or writing only to primary version 500 as is described above with reference to FIG. 7.

Figure 10:
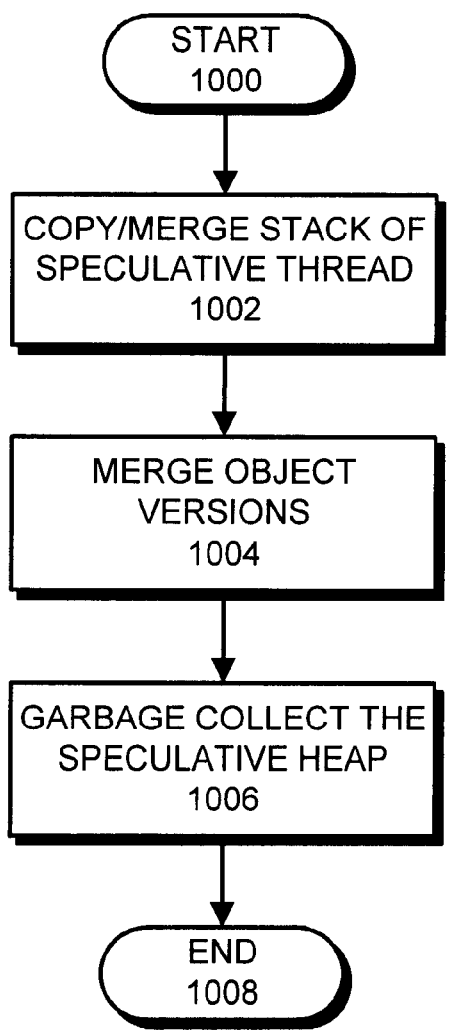
FIG. 10 is a flow chart illustrating operations involved in performing a join between a head thread and a speculative thread in accordance with an embodiment of the present invention.

FIG. 10 is a flow chart illustrating operations involved in a join operation between head thread 202 and a speculative thread 203 in accordance with an embodiment of the present invention. A join operation occurs for example when head thread 202 reaches a point in the program where speculative thread 203 began executing. The join operation causes state associated with the speculative thread 203 to be merged with state associated with the head thread 202. This involves copying and/or merging the stack of speculative thread 203 into the stack of head thread 202 (step 1002). It also involves merging space-time dimension and primary versions of objects (step 1004) as well as possibly garbage collecting speculative heap 406 (step 1006). In one embodiment of the present invention, one of threads 202 or 203 performs steps 1002 and 1006, while the other thread performs step 1004.

Figure 11:
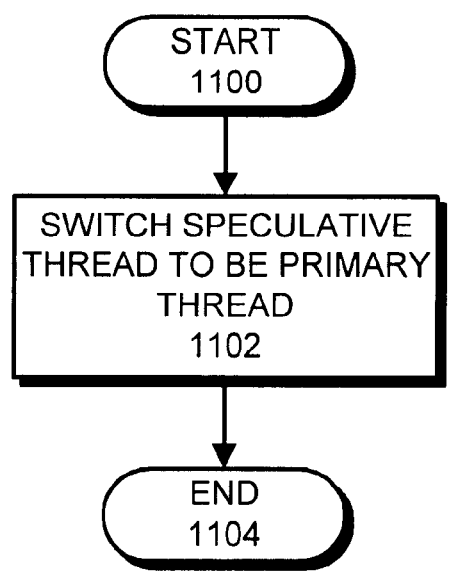
FIG. 11 is a flow chart illustrating operations involved in performing a join between a head thread and a speculative thread in accordance with another embodiment of the present invention.

FIG. 11 is a flow chart illustrating operations involved in a join operation between head thread 202 and a speculative thread 203 in accordance with another embodiment of the present invention. In this embodiment, speculative thread 203 carries on as a pseudo-head thread. As a pseudo-head thread, speculative thread 203 uses indirection to reference space-time dimensioned versions of objects, but does not mark objects or create versions. While speculative thread 203 is acting as a pseudo-head thread, head thread 202 updates primary versions of objects.

Handling Exception Conditions Using a
Conditional Trap Instruction

Figure 12:
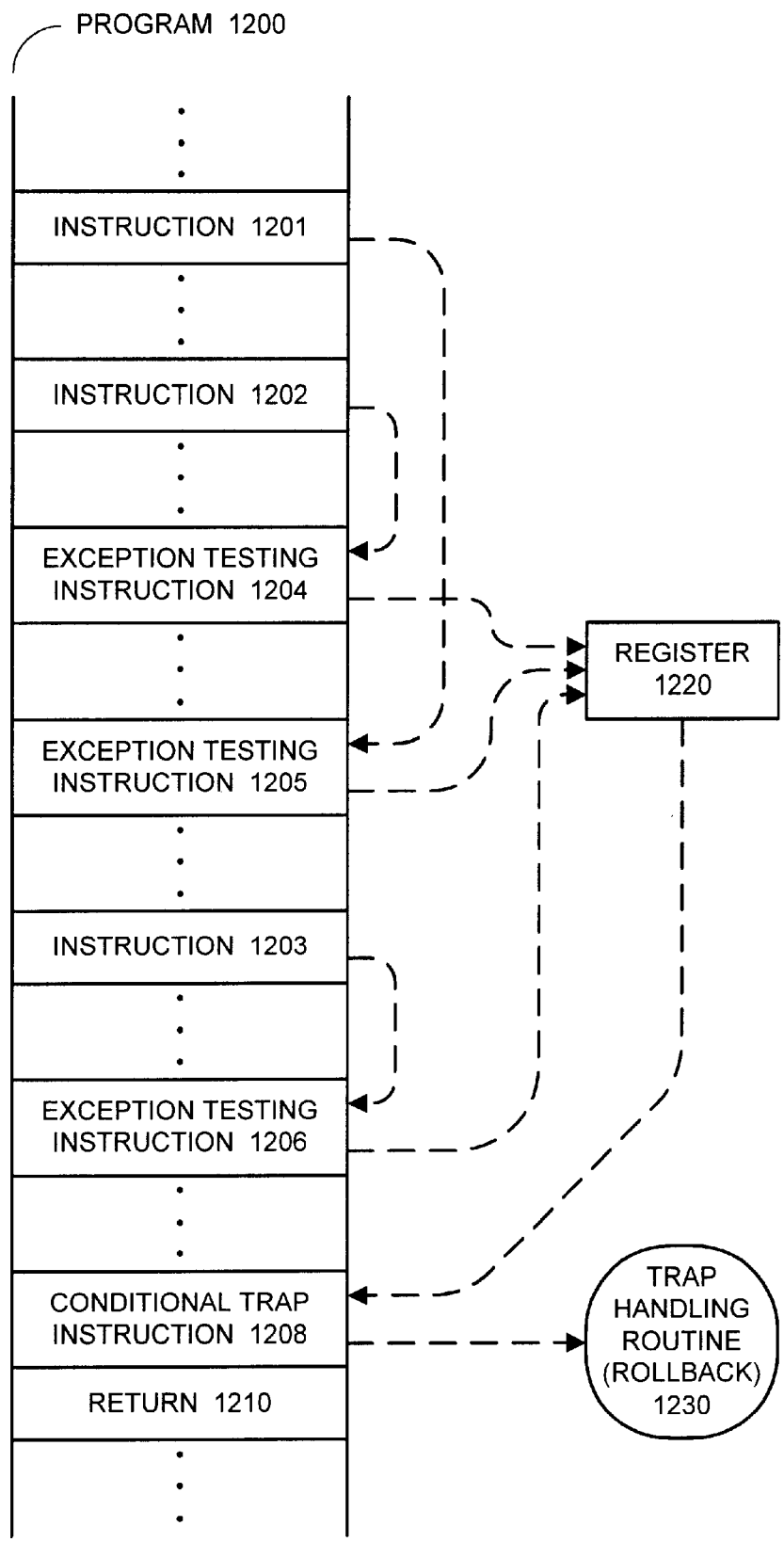
FIG. 12 illustrates how a head thread communicates with a speculative thread by using a conditional trap instruction in accordance with an embodiment of the present invention.

FIG. 12 illustrates how exceptions are detected and handled in accordance with an embodiment of the present invention. FIG. 12 illustrates a program 1200, including a number of instructions 1201–1203, which can possibly generate exception conditions. Each of these instructions 1201–1203 is associated with at least one exception testing instruction. More specifically, instruction 1201 is associated with exception testing instruction 1205, instruction 1202 is associated with exception testing instruction 1204, and instruction 1203 is associated with exception testing instruction 1206. Note that exception testing instructions 1204–1206 do not have to immediately follow their corresponding instructions 1201–1203. In general, exception testing instructions 1204–1206 can be scheduled in available free instructions slots following instructions 1201–1203.

Note that if exception testing instructions 1204–1206 detect exception conditions, they write an exception condition indicator to register 1220.

A conditional trap instruction 1208 is inserted at the end of a code module (e.g., a method, function or procedure) containing instructions 1201–1203. Conditional trap instruction 1208 reads register 1220 and determines from register 1220 if an exception condition occurred.

If so, conditional trap instruction 1208 jumps to a trap handling routine 1230. In one embodiment of the present invention, trap handling routine 1230 causes speculative thread 203 to rollback in order to deal with the exception condition.

Note that in general any instruction that causes a conditional trap can be used with the present invention. In one embodiment of the present invention, exception testing instructions 1204–1206 set register (R7) 1220 to a zero value upon detection of an exception condition. In this embodiment, conditional trap instruction 1208 is a bounds checking instruction, such as BNDCHK R7, 0, R7, which executes trap handling routine 1230 if the value of R7 equals zero.

In one embodiment of the present invention, the presently described exception handling process is applied only to code executed by speculative thread 203, not head thread 202. Note that the actions of speculative thread 203 can be easily undone by the rollback process. This allows the compiler to schedule the exception handling code at a later point in time. This exception handling code would normally have to be scheduled so that it immediately follows the associated instruction that can cause an exception condition in order to enable the system to handle the exception condition before another instruction is executed. However, in the case of speculative thread 203, the system is able to undo the effects of instructions following the instruction that generated the exception condition by rolling back speculative thread 203.

Figure 13:
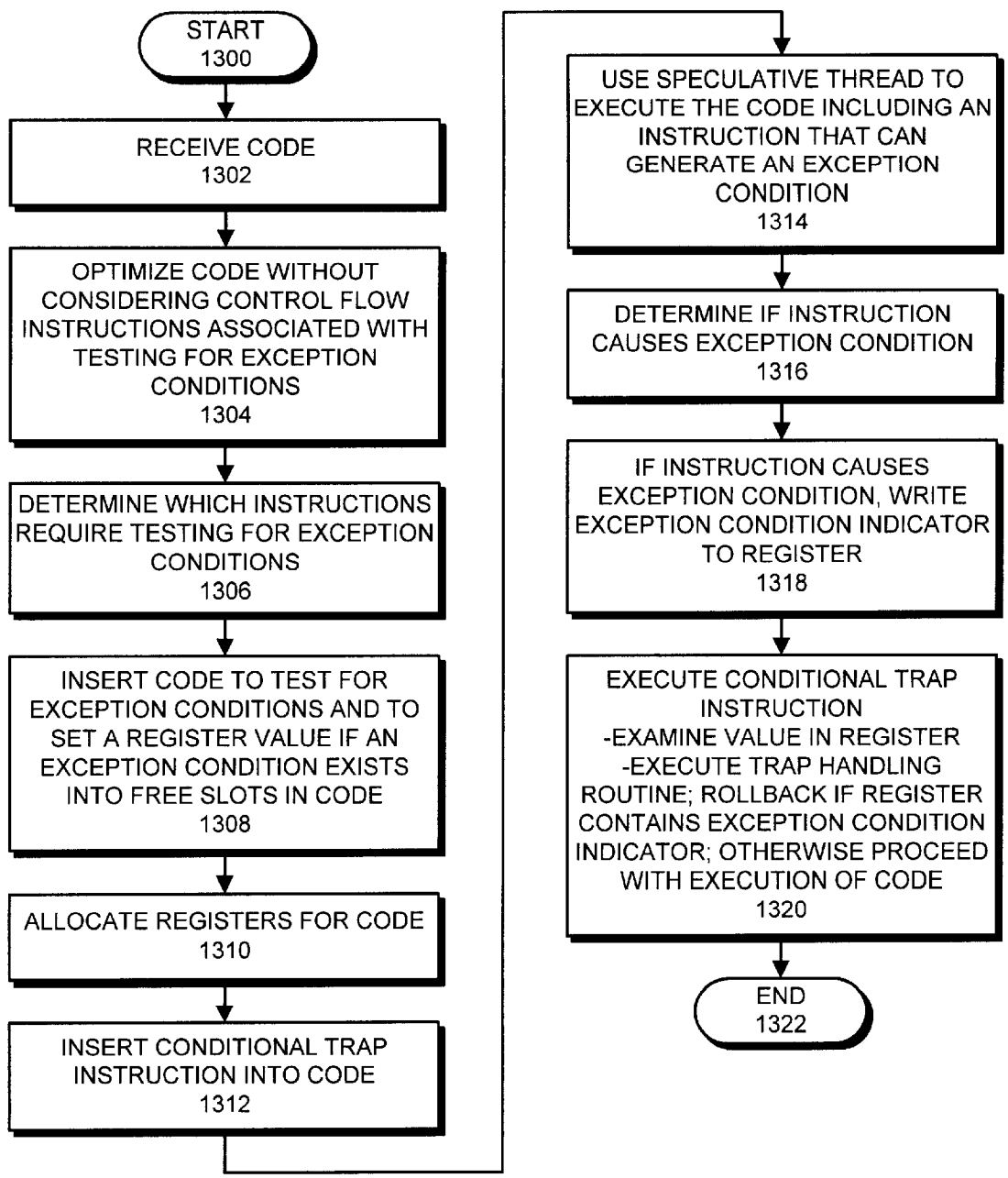
FIG. 13 illustrates how exceptions are detected and handled in accordance with an embodiment of the present invention.

FIG. 13 is a flow chart illustrating the process of facilitating detection and handling of an exception condition in accordance with an embodiment of the present invention. The system operates by receiving code to be compiled (step 1302). In one embodiment of the present invention, the system receives an entire program to be compiled. In another embodiment, the system receives a single code module to be compiled on-the-fly as part of a just-in-time compilation process.

During compilation, the system moves instructions around to optimize the code (step 1304). This optimization is carried out without regard to the control flow instructions associated with testing for exception conditions. These control flow instructions would normally severely restrict the manner in which code could be reorganized to optimize the code. Note that the ability to move code around during the optimization process is particularly advantageous in optimizing code for computer architectures that support multiple functional units that can operate in parallel.

Next, the system determines which instructions in the code can potentially generate exception conditions (step 1306). For each of these instructions, the system inserts code to test for the exception conditions into free slots that remain in the code (step 1308).

The system then allocates registers for the code as part of the normal compilation process (step 1310).

Next, the system inserts a conditional trap instruction into the code (step 1312). In one embodiment of the present invention, the conditional trap instruction is inserted in the vicinity of a return from a function or a method. In this embodiment, the conditional trap instruction detects if any of the instructions in the function or method generated an exception condition.

After the compilation process is complete, the system uses speculative thread 203 to execute the code (step 1314). This includes executing at least one instruction that can cause an exception condition, such as instruction 1201 from FIG. 12. The system subsequently determines if instruction 1201 generated an exception condition by executing at least one exception testing instruction 1205 (step 1316). If instruction 1201 generated an exception condition, the at least one exception testing instruction 1205 writes an exception condition indicator to register 1220 (step 1318). In one embodiment of the present invention, register 1220 is a processor status register.

The system ultimately executes a conditional trap instruction 1208 (step 1320. Conditional trap instruction 1208 examines a value in register 1220. If the value is an exception condition indicator, conditional trap instruction 1208 traps to trap handling routine 1230. In one embodiment of the present invention, trap handling routine 1230 causes a rollback of speculative thread 203 in order to handle the exception condition.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for supporting exception handling through use of a conditional trap instruction, the method operating in a system that supports a head thread that executes program instructions and a speculative thread that speculatively executes program instructions in advance of the head thread, the method comprising:

using the speculative thread to execute at least one instruction that performs an operation that can cause an exception condition;

determining if the instruction causes the exception condition by executing an exception testing instruction after each of the at least one instructions, wherein the exception testing instruction does not need to immediately follow the tested instruction;

if the instruction causes the exception condition, writing an exception condition indicator to a register; and executing the conditional trap instruction which,
        examines a value in the register,
        executes a trap handling routine to handle the exception condition if the value in the register is the exception condition indicator, and
        proceeds with execution of the code if the value in the register is not the exception condition indicator:

wherein the head thread executes on a first processor and the speculative thread executes concurrently on a second processor.

2. The method of claim 1, further comprising, prior to executing the at least one instruction, allowing a compiler to optimize a program containing the at least one instruction by scheduling an exception testing instruction associated with each of the at least one instructions to occupy a free instruction slot following the instruction, the exception testing instruction determining if the instruction causes the exception condition.

3. The method of claim 2, further comprising performing register allocation as part of the optimization process.

4. The method of claim 2, wherein the compiler operates as part of a just-in-time compilation mechanism.

5. The method of claim 1, wherein the trap handling routine triggers a rollback operation to undo operations performed by the speculative thread.

6. The method of claim 1, further comprising, prior to executing the instruction, inserting the conditional trap instruction in a vicinity of a return from a code module containing the instruction, so that the conditional trap instruction is executed at the end of the code module, and detects whether instructions within the code module caused an exception condition.

7. The method of claim 1, wherein the at least one instruction includes one of:

a getfield instruction that generates the exception condition if a reference to an object containing the field is a null pointer;

a putfield instruction that generates the exception condition if a reference to the object containing the field is a null pointer;

a check cast instruction that assigns a value to a first variable if the value originates from a second variable with a type that matches the type of the first variable, and if not generates the exception condition; and an array store instruction that assigns a value to an array element if the type of the array element matches the type of a variable from which the value originated, and if not generates the exception condition.

8. The method of claim 1, wherein the conditional trap instruction is located within a very long instruction word (VLIW) instruction.

9. A computer-readable storage medium storing instructions that when executed by a computer cause the computer to perform a method for supporting exception handling through use of a conditional trap instruction, the method operating in a system that supports a head thread that executes program instructions and a speculative thread that speculatively executes program instructions in advance of the head thread, the method comprising:

using the speculative thread to execute at least one instruction that performs an operation that can cause an exception condition;

determining if the instruction causes the exception condition by executing an exception testing instruction after each of the at least one instructions, wherein the exception testing instruction does not need to immediately follow the tested instruction;

if the instruction causes the exception condition, writing an exception condition indicator to a register; and executing the conditional trap instruction which,
        examines a value in the register,
        executes a trap handling routine to handle the exception condition if the value is the exception condition indicator, and proceeds with execution of the code if the value in the register is not the exception condition indicators;

wherein the head thread executes on a first processor and the speculative thread executes concurrently on a second processor.

10. The computer-readable storage medium of claim 9, wherein the method further comprises, prior to executing the at least one instruction, allowing a compiler to optimize a program containing the at least one instruction by scheduling an exception testing instruction associated with each of the at least one instructions to occupy a free instruction slot following the instruction, the exception testing instruction determining if the instruction causes the exception condition.

11. The computer-readable storage medium of claim 10, wherein the method further comprises performing register allocation as part of the optimization process.

12. The computer-readable storage medium of claim 10, wherein the compiler operates as part of a just-in-time compilation mechanism.

13. The computer-readable storage medium of claim 9, wherein the trap handling routine triggers a rollback operation to undo operations performed by the speculative thread.

14. The computer-readable storage medium of claim 9, wherein the method further comprises, prior to executing the instruction, inserting the conditional trap instruction in a vicinity of a return from a code module containing the instruction, so that the conditional trap instruction is executed at the end of the code module, and detects whether instructions within the code module caused an exception condition.

15. The computer-readable storage medium of claim 9, wherein the at least one instruction includes one of:

a getfield instruction that generates the exception condition if a reference to an object containing the field is a null pointer;

a putfield instruction that generates the exception condition if a reference to the object containing the field is a null pointer;

a check cast instruction that assigns a value to a first variable if the value originates from a second variable with a type that matches the type of the first variable, and if not generates the exception condition; and an array store instruction that assigns a value to an array element if the type of the array element matches the type of a variable from which the value originated, and if not generates the exception condition.

16. The computer-readable storage medium of claim 9, wherein the conditional trap instruction is located within a very long instruction word (VLIW) instruction.

17. An apparatus that supports exception handling through use of a conditional trap instruction, comprising:

an operating system that supports a head thread that executes program instructions and a speculative thread that speculatively executes program instructions in advance of the head thread wherein the head thread executes on a first processor and the speculative thread executes concurrently on a second processor; and an execution mechanism that is configured to execute instructions for the speculative thread, the instructions including, at least one instruction that performs an operation that can cause an exception condition, an exception testing instruction, which is placed after each of the at least one instructions, wherein the exception testing instruction does not need to immediately follow the tested instruction; and which, determines if the instruction causes the exception condition, and writes an exception condition indicator to a register if the instruction causes the exception condition, and the conditional trap instruction which, examines a value in the register, executes a trap handling routine to handle the exception condition if the value is the exception condition indicator, and proceeds with execution of the code if the value in the register is not the exception condition indicator.

18. The apparatus of claim 17, further comprising a compiler that optimizes a program containing the at least one instruction by scheduling the exception testing instruction associated with each of the at least one instructions to occupy a free instruction slot following the instruction.

19. The apparatus of claim 18, wherein the compiler is additionally configured to perform register allocation as part of the optimization process.

20. The apparatus of claim 18, wherein the compiler is configured to perform just-in-time compilation.

21. The apparatus of claim 17, wherein the trap handling routine is configured to trigger a rollback operation to undo operations performed by the speculative thread.

22. The apparatus of claim 17, wherein the conditional trap instruction is located in a vicinity of a return from a code module containing the instruction, so that the conditional trap instruction is executed at the end of the code module, and detects whether instructions within the code module caused an exception condition.

23. The apparatus of claim 17, wherein the at least one instruction includes one of:

a getfield instruction that generates the exception condition if a reference to an object containing the field is a null pointer;

a putfield instruction that generates the exception condition if a reference to the object containing the field is a null pointer;

a check cast instruction that assigns a value to a first variable if the value originates from a second variable with a type that matches the type of the first variable, and if not generates the exception condition; and an array store instruction that assigns a value to an array element if the type of the array element matches the type of a variable from which the value originated, and if not generates the exception condition.

24. The apparatus of claim 17, wherein the conditional trap instruction is located within a very long instruction word (VLIW) instruction.

* * * * *